(12) United States Patent
Kim et al.

(10) Patent No.: US 8,944,664 B2
(45) Date of Patent: Feb. 3, 2015

(54) DISPLAY DEVICE AND HEAT DISSIPATING MEMBER

(71) Applicant: Samsung Display Co., Ltd., Yongin, Gyeonggi-Do (KR)

(72) Inventors: Yong Hwi Kim, Asan-si (KR); Won Jin Kim, Chungcheongnam-do (KR); Sang Hoon Lee, Daejeon (KR); Seong Sik Choi, Seoul (KR); Jae Chang Choi, Yongin-si (KR)

(73) Assignee: Samsung Display Co., Ltd. (KR)

( * ) Notice: Subject to any disclaimer, the term of this patent is extended or adjusted under 35 U.S.C. 154(b) by 71 days.

(21) Appl. No.: 13/734,660

(22) Filed: Jan. 4, 2013

(65) Prior Publication Data

US 2014/0003031 A1    Jan. 2, 2014

(30) Foreign Application Priority Data

Jun. 27, 2012 (KR) .................... 10-2012-0069241

(51) Int. Cl.
- *F21V 29/00* (2006.01)
- *G09F 13/04* (2006.01)
- *G02F 1/1335* (2006.01)
- *B82B 1/00* (2006.01)

(52) U.S. Cl.
CPC .............. *F21V 29/22* (2013.01); *G02F 1/1336* (2013.01); *G02F 1/133615* (2013.01); *F21V 29/26* (2013.01); *G09F 13/04* (2013.01); *G02F 1/133603* (2013.01); *G02F 1/133608* (2013.01); *G02F 2001/133628* (2013.01); *B82B 1/005* (2013.01)
USPC .............. 362/623; 362/612; 362/613

(58) Field of Classification Search
CPC ................................ F21V 29/22; G09F 13/04
USPC .......................................... 362/623, 612, 613
See application file for complete search history.

(56) References Cited

U.S. PATENT DOCUMENTS

| | | | |
|---|---|---|---|
| 7,520,639 B2 | 4/2009 | Kim | |
| 2006/0002142 A1* | 1/2006 | Jeong et al. | ................... 362/612 |
| 2006/0051207 A1 | 3/2006 | Becerra et al. | |
| 2006/0092666 A1* | 5/2006 | Jeong et al. | ................... 362/613 |
| 2007/0041212 A1* | 2/2007 | Cho et al. | ...................... 362/561 |
| 2009/0015755 A1 | 1/2009 | Bang et al. | |
| 2009/0122533 A1 | 5/2009 | Brukilacchio | |
| 2009/0290342 A1 | 11/2009 | Zhang et al. | |

(Continued)

FOREIGN PATENT DOCUMENTS

| | | |
|---|---|---|
| EP | 2169458 A1 | 3/2010 |
| EP | 2312660 A2 | 4/2011 |
| EP | 2466367 A2 | 6/2012 |
| JP | 3098463 U | 10/2003 |

(Continued)

OTHER PUBLICATIONS

The extended European Search Report for European Patent Application No. 13151420.0 dated Mar. 21, 2013.

*Primary Examiner* — Elmito Breval
(74) *Attorney, Agent, or Firm* — Cantor Colburn LLP

(57) ABSTRACT

A display device includes: a display panel; a bottom container member which receives the display panel; an auxiliary member including a bottom, and a side extending from an edge of the bottom, and coupled with the bottom container member; a light source unit coupled with the side of the auxiliary member; and a first heat radiating member between the auxiliary member and the light source unit. The first heat radiating member includes a phase change material.

21 Claims, 13 Drawing Sheets

(56) References Cited

U.S. PATENT DOCUMENTS

| | | | |
|---|---|---|---|
| 2010/0066937 A1 | 3/2010 | Yamashita et al. | |
| 2010/0177498 A1* | 7/2010 | Choi et al. | 362/97.1 |
| 2011/0007236 A1 | 1/2011 | Kim et al. | |
| 2011/0037920 A1 | 2/2011 | Kim et al. | |
| 2011/0205741 A1* | 8/2011 | Suzuki | 362/294 |
| 2012/0014135 A1 | 1/2012 | Kim | |
| 2012/0293719 A1* | 11/2012 | Negoro | 348/725 |
| 2013/0182412 A1* | 7/2013 | Choi et al. | 362/97.1 |
| 2014/0003090 A1* | 1/2014 | Chang et al. | 362/612 |

FOREIGN PATENT DOCUMENTS

| | | |
|---|---|---|
| JP | 2006011242 A | 1/2006 |
| JP | 2006310221 A | 11/2006 |
| JP | 2010078738 A | 4/2010 |
| KR | 1020070053517 A | 5/2007 |
| KR | 1020080101044 A | 11/2008 |
| KR | 100949452 B1 | 3/2010 |
| KR | 100997638 B1 | 11/2010 |
| KR | 1020110014840 A | 2/2011 |
| WO | 2007056599 A2 | 5/2007 |
| WO | 2008056214 A2 | 5/2008 |

* cited by examiner

DISPLAY DEVICE AND HEAT DISSIPATING MEMBER

This application claims priority to Korean Patent Application No. 10-2012-0069241 filed on Jun. 27, 2012, and all the benefits accruing therefrom under 35 U.S.C. §119, the entire contents of which are incorporated herein by reference.

BACKGROUND (a) Field

The invention relates to a display device, and more particularly, to a display device including a heat radiating member capable of efficiently discharging heat generated from a light source to an outside of the display device.

(b) Description of the Related Art

Display devices are widely used for a computer monitor, a television, a mobile phone and the like. The display devices include a cathode ray tube display device, a liquid crystal display device, a plasma display device, and the like.

A liquid crystal display device which is one of the most common types of flat panel display devices in use, includes two sheets of panels with field generating electrodes such as a pixel electrode, a common electrode, and the like, and a liquid crystal layer interposed between the two sheets of panels. The liquid crystal display device generates an electric field in the liquid crystal layer by applying voltage to the field generating electrodes, and determines the direction of liquid crystal molecules of the liquid crystal layer by the generated electric field, thus controlling polarization of incident light so as to display images.

Since the liquid crystal display device itself does not emit light, a light source is required. The light source may be an artificial light source which is separately provided or may be a natural light source. The artificial light source used in the liquid crystal display device includes a light emitting diode ("LED"), a cold cathode fluorescent lamp ("CCFL"), an external electrode fluorescent ("EEFL"), and the like.

When the light source is operated for a long time, a temperature of the liquid crystal display device is increased and as a result, a driving circuit in the liquid crystal display device may undesirably malfunction or have a short life. Additionally, a light guide plate and the like in the liquid crystal display device may undesirably deform.

SUMMARY

The invention has been made in an effort to provide a display device including a heat radiating member having advantages of efficiently discharging heat generated from a light source to an outside of the display device.

An exemplary embodiment of the invention provides a display device, including: a display panel; a bottom container member which receives the display panel; an auxiliary member including a bottom, and a side extending from a first edge of the bottom, and coupled with the bottom container member; a light source unit coupled with the side of the auxiliary member; and a first heat radiating member between the auxiliary member and the light source unit. The first heat radiating member includes a first phase change material.

The bottom container member may include electrolytic galvanized iron.

The light source may include a printed circuit board, and a rear side of the printed circuit board may be coupled with the auxiliary member. The display device may further include a coupling unit coupling the printed circuit board with the auxiliary member, and the coupling unit may include a coupling groove on the rear side of the printed circuit board; and a coupling member at the auxiliary member and insertable in the coupling groove.

The display device may further include a second heat radiating member between the auxiliary member and the bottom container member. The second heat radiating member may include a second phase change material.

The display device may further include a fastening member which fastens the auxiliary member to the bottom container member. The fastening member may include a screw.

The light source unit may further include a light emitting member on a front side of the printed circuit board.

The electrolytic galvanized iron may include a surface which is treated with a heat radiating paint.

The heat radiating paint may include a material including a carbon nanotube.

A length from the first edge of the bottom of the auxiliary member to an opposing second edge may be about 100 millimeters (mm) to about 130 mm.

A thickness of the first heat radiating member may be about 0.03 mm to about 0.3 mm.

A width of the first heat radiating member may be about 30% to about 100% a width of the printed circuit board.

The coupling unit may further include a plurality of coupling grooves, and the first heat radiating member may be between adjacent coupling grooves.

The coupling member may include a protrusion protruding from the side of the auxiliary member; and a coupling protrusion at a distal end of the protrusion.

The coupling groove may include an inserting portion into which the coupling protrusion of the coupling member is inserted; and a coupling groove portion which extends continuously from the inserting portion and to which the protrusion is hooked.

A cross section of the coupling member and the coupling groove may be a circular, truncated triangular, T-lettered, diamond or trapezoidal shape.

The auxiliary member may further include a stopper extending from an edge of the side.

Another exemplary embodiment of the invention provides a display device, including: a display panel; a bottom container member which receives the display panel; an auxiliary member including a bottom, and a side extending from an edge of the bottom, and coupled with the bottom container member; a light source unit coupled with the side of the auxiliary member; and a heat radiating member between the auxiliary member and the bottom container member. The heat radiating member includes a phase change material.

The bottom container member may include electrolytic galvanized iron.

The light source unit may include a printed circuit board, and a rear side of the printed circuit board may be coupled with the auxiliary member. The display device may further include a coupling unit coupling the printed circuit board with the auxiliary member. The coupling unit may include a coupling groove on the rear side of the printed circuit board; and a coupling member at the auxiliary member and inserted in the coupling groove.

The electrolytic galvanized iron may include a surface which is treated with a heat radiating paint.

As described above, one or more exemplary embodiment of the display device according to the invention has the following effects.

According to one or more exemplary embodiment of the, a heat radiating member including a phase change material is between an auxiliary member and a light source unit, and a bottom container member includes electrolytic galvanized iron of which a surface is treated with a heat radiating paint, such that a heat radiating effect is improved.

Further, the length of the auxiliary member is decreased by improving the heat radiating effect, reducing cost, and increasing product package and movement efficiency.

In addition, the heat radiating effect is further improved by the heat radiating member including a phase change material between the auxiliary member and the bottom container member.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
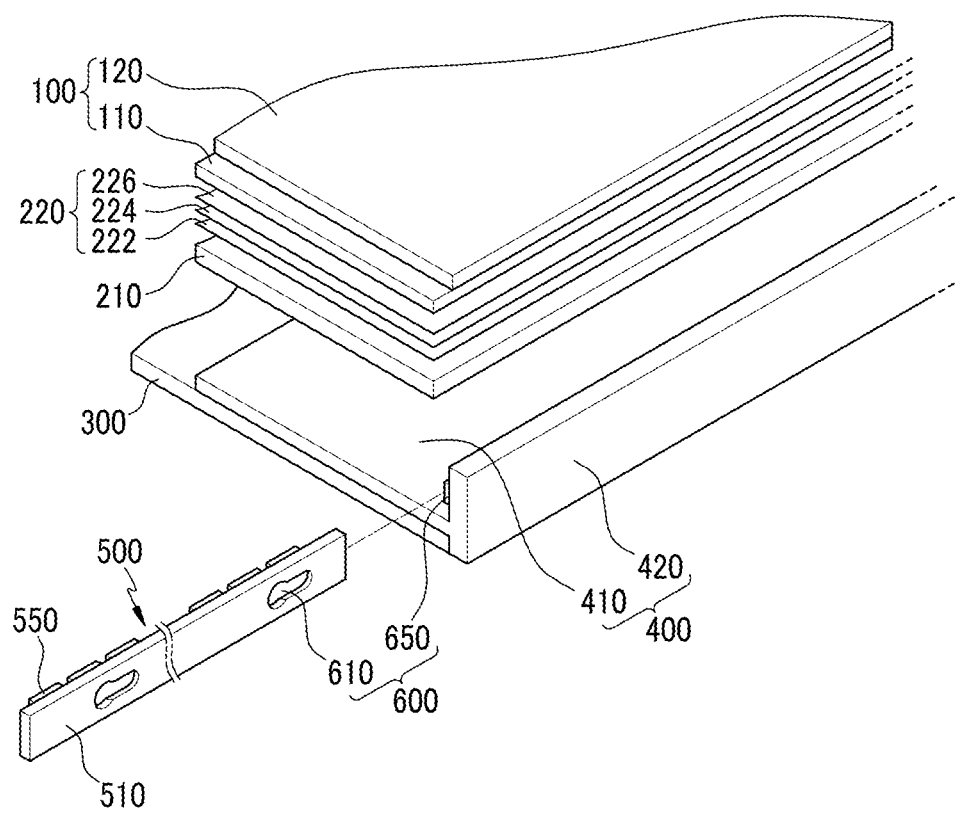
FIG. 1 is an exploded perspective view illustrating an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

First, an exemplary embodiment of a display device according to the invention will be described below with reference to the accompanying drawings.

FIG. 1 is an exploded perspective view illustrating an exemplary embodiment of a display device according to the invention.

The exemplary embodiment of the display device includes a display panel 100, a bottom container member 300 receiving the display panel 100, an auxiliary member 400 coupled with the bottom container member 300, and a light source unit 500 coupled with the auxiliary member 400, as shown in FIG. 1.

The display panel 100 includes a first substrate 110 and a second substrate 120 which face each other and are coupled to each other, and a liquid crystal layer (not shown) between the first substrate 110 and the second substrate 120. Although not shown, a gate line and a data line, and a thin film transistor connected thereto are on the first substrate 110. The first substrate may include a plurality of gate line, a plurality of data lines, and a plurality of thin film transistors respectively connected thereto. Further, when the thin film transistor is turned on by a signal which is applied from the gate line, a signal from the data line may be applied to a pixel electrode of the display panel 100. A common electrode may be on the first substrate 110 or the second substrate 120, and an electric field is formed between the pixel electrode and the common electrode to control an alignment of liquid crystal molecules of the liquid crystal layer. Accordingly, light which is inputted from the light source unit 500 is controlled such that the display panel displays an image.

The bottom container member 300 is below the display panel 100 to receive and protect the display panel 100.

Since the bottom container member 300 is coupled with the auxiliary member 400, and the auxiliary member 400 is coupled with the light source unit 500, a degree of discharging heat which is generated from the light source unit 500 is changed depending on a material of the bottom container member 300.

The material of the bottom container member 300 may include electrolytic galvanized iron ("EGI"). Furthermore, the material of the bottom container member 300 may include electrolytic galvanized iron which is surface-treated with a heat radiating paint, but is not limited thereto or thereby.

The electrolytic galvanized iron may be defined as iron which is plated with zinc by an electric action in a cold-rolled iron state after hot-rolled iron is processed through pickling, cold-rolling, annealing and/or skin pass milling processes, but is not limited thereto or thereby. The electrolytic galvanized iron, is a product in which corrosion resistance is increased by coating zinc on the surface of the cold-rolled iron or hot-rolled iron by an electrolytic process. Such electrolytic galvanized iron has excellent paint-finishing properties and corrosion resistance after painting because a plating coating amount is relatively small, uniform, and substantially flat as compared with hot dip galvanized iron.

In the electrolytic galvanized iron, since the plating is performed close to room temperature and a material characteristic of the raw plating material may be maintained, a width of the material selection is wide and processability is excellent. Further, a mechanical property of the raw plating material may be maintained as compared with the hot dip galvanized iron, and the coating amount of the plating material is easily controlled by current density and a line speed, such that alloyed, complex, multi-layered, and thin film products of the plating material may be produced.

An electrolytic galvanized metal may be single galvanized, alloy galvanized, dual-layer galvanized, and the like depending on a metal which is galvanized. The single galvanized metal includes pure electrolytic galvanized iron, the alloy galvanized metal includes Zn—Ni, Zn—Fe, Zn—Mn, Zn—Cr, Zn—Ni—Cr and the like, and the dual-layer galvanized metal includes Fe—Zn/Zn—Fe, Fe—P/Zn—Fe, Fe—Mn/Zn—Fe and the like.

The electrolytic galvanized iron is classified into steel, electrogalvanized, hot-rolled, commercial quality ("SEHC"), steel, electrogalvanized, hot-rolled, drawing quality ("SEND"), steel, electrogalvanized, hot-rolled, deep drawing quality ("SEHE"), steel, electrogalvanized, cold-rolled, commercial quality ("SECC"), steel, electrogalvanized, cold-rolled, drawing quality ("SECD"), steel, electrogalvanized, cold-rolled, deep drawing quality ("SECE") and the like based on a raw plating material, a chemical component, and the like. Among them, the SECC has a thickness of about 0.4 millimeter (mm) to about 3.2 mm and contains carbon (C) of about 0.15% or less, manganese (Mn) of about 0.60% or less, phosphorus (P) of about 0.50% or less, and sulfur (S) of about 0.50% or less.

In one exemplary embodiment of the invention, the SECC is surface-treated with a heat radiating paint to be used as a material of the bottom container member 300. The heat radiating paint may include a material including a carbon nanotube, but is not limited thereto or thereby. The carbon nanotube is a minute molecule having a diameter of 1 nanometer (nm, one-billionth of a meter (m)) in which carbons connected with a hexagonal ring form a relatively long tubular shape.

In one exemplary embodiment, the electrolytic galvanized iron of which the surface is treated with a heat radiating paint may be formed by coating the heat radiating paint on the surface of the SECC or may be formed by spraying the heat radiating paint. Further, the electrolytic galvanized iron of which the surface is treated with a heat radiating paint may be formed by attaching a separately formed sheet including the heat radiating paint on the surface of the SECC.

Referring again to FIG. 1, the auxiliary member 400 includes a bottom 410, and a side 420 which extends from an edge of the bottom 410 and has a curved or bent shape. The bottom 410 of the auxiliary member 400 is coupled with the bottom container member 300. The side 420 of the auxiliary member 400 may be substantially vertical to the bottom 410, and may be bent or curved upwards toward the display panel 100 and downwards towards a rear of the display device with respect to the bottom 410. The bottom 410 and the side 420 may collectively form the auxiliary member as a single, unitary, indivisible member.

A portion of the side 420 which is extended above the bottom 410 is coupled with the light source unit 500. A portion of the side 420 which is below the bottom 410 may contact an edge surface of the bottom container member 300.

The auxiliary member 400 may include aluminum and/or may be formed by an extruding process, but is not limited thereto or thereby.

A coupling structure of the auxiliary member 400 and the light source unit 500 will be described below in more detail with reference to FIGS. 2 to 4.

The light source unit 500 includes a printed circuit board 510, and a light emitting member 550 on an upper surface of the printed circuit board 510. The light source unit 500 may include a plurality of light emitting members 550 on a surface of the printed circuit board 510.

The printed circuit board 510 may include a metal plate. The printed circuit board 510 may include a circuit or a plurality of circuits, electrically connected with the light emitting member 550, on a surface thereof.

The plurality of light emitting members 550 may be on the printed circuit board 510 and spaced apart from each other at predetermined intervals. The light emitting member 550 may include a light emitting diode ("LED") and the like.

The display device may further include a light guide plate 210 and/or an optical sheet 220 below the display panel 100.

The light guide plate 210 substantially uniformly transfers light emitted from the light source unit 500 to an entire surface of the display panel 100. The light guide plate 210 may include an acrylic injection material, but is not limited thereto or thereby.

The optical sheet 220 is configured to increase collecting efficiency of the light emitted from the light source unit 500 such that distribution of the light is substantially entirely uniform. The optical sheet 220 may be configured of a plurality of various sheets, for example, a sequentially laminated diffuser sheet 222, prism sheet 224 and protecting sheet 226, but is not limited thereto or thereby.

The diffuser sheet 222 diffuses the light emitted from the light source unit 500. The prism sheet 224 collects the light diffused from the diffuser sheet 222 into a vertical direction with respect to a plane of the display panel 100. Most of the light passing through the prism sheet 224 is vertically incident to the display panel 100. Further, the protecting sheet 226 may be disposed on the prism sheet 224 and protects the prism sheet 224 against an external impact.

As illustrated in FIG. 1, the optical sheet 220 includes one diffuser sheet 222, one prism sheet 224 and one protecting sheet 226, but the invention is not limited thereto. In an alternative exemplary embodiment, one or more of the diffuser sheet 222, the prism sheet 224 and the protecting sheet 226 may be omitted as necessary.

Hereinafter, a coupling structure of the auxiliary member 400 and the light source unit 500 will be described below in detail with reference to FIGS. 2 to 4.

Figure 2:
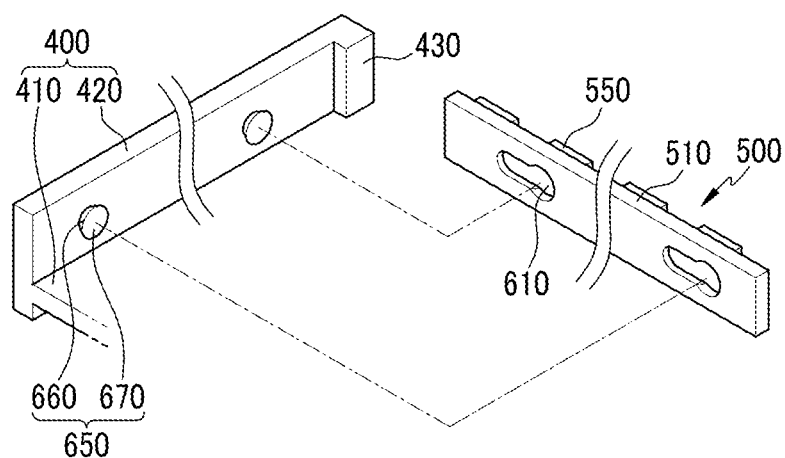
FIG. 2 is an exploded perspective view illustrating an exemplary embodiment of an auxiliary member and a light source unit in a display device according to the invention.
Figure 3:
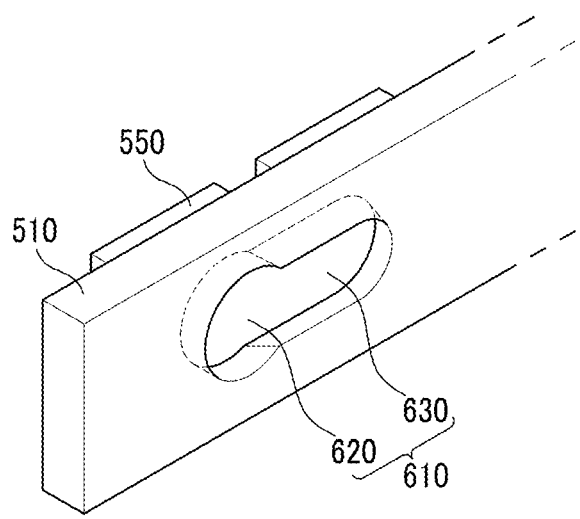
FIG. 3 is an enlarged perspective view illustrating an exemplary embodiment of a portion of the light source unit in a display device according to the invention.
Figure 4:
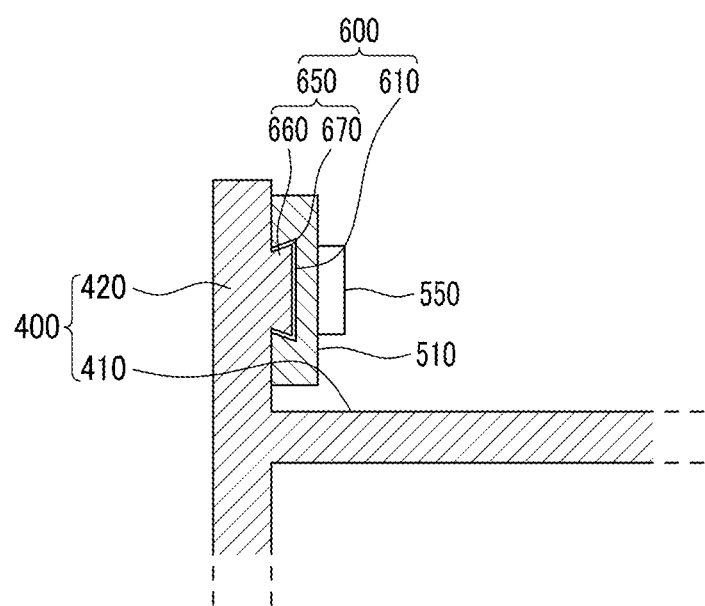
FIG. 4 is a cross-sectional view illustrating an exemplary embodiment of a state where an auxiliary member and a light source unit are coupled with each other in a display device according to the invention.

FIG. 2 is an exploded perspective view illustrating an exemplary embodiment of an auxiliary member and a light source unit in a display device according to the invention, FIG. 3 is an enlarged perspective view illustrating an exemplary embodiment of a portion of a light source unit in a display device according to the invention, and FIG. 4 is a cross-sectional view illustrating an exemplary embodiment of a state where an auxiliary member and a light source unit are coupled with each other in a display device according to the invention.

The printed circuit board 510 of the light source unit 500 is coupled with the auxiliary member 400 by a coupling unit 600. The printed circuit board 510 of the light source unit 500 may be coupled with the auxiliary member 400 solely by the coupling unit 600, but is not limited thereto or thereby.

The coupling unit 600 includes a coupling groove 610 and a coupling member 650, as shown in FIGS. 2 to 4. The coupling groove 610 is on a rear side of the printed circuit board 510 and has a longitudinal axis extending in a same direction as a longitudinal axis of the printed circuit board 510. The coupling member 650 is on the side 420 of the auxiliary member 400. The coupling member 650 is on an inner surface of the side 420.

The coupling member 650 of the coupling unit 600 includes a protrusion 660 extending from the auxiliary member 400, and a coupling protrusion 670 on the protrusion 660. The coupling protrusion 670 may be at a distal end of the protrusion 660.

The coupling groove 610 of the coupling unit 600 includes an insertion portion 620 into which the coupling member 650 is inserted from the rear side of the printed circuit board 510, and a coupling groove portion 630 which is continuous with and extends from the insertion portion 620. The coupling groove portion 630 of the coupling groove 610 is hooked to the protrusion 660 of the coupling member 650, to couple the printed circuit board 510 to the auxiliary member 400.

A planar dimension of the coupling protrusion 670 may be larger than that of the protrusion 660. Similarly, a planar dimension of the insertion portion 620 into which the coupling protrusion 670 is initially inserted, is larger than that of the coupling groove portion 630. The dimension of the insertion portion 620 and the coupling groove portion 630 may correspond respectively to the dimension of the coupling protrusion 670 and the protrusion 660. Once inserted into the insertion portion 620 of the insertion groove 610, the coupling member 650 is moveable within the insertion groove 610 with respect to a longitudinal axis of the printed circuit board 510 such that the coupling protrusion 670 overlaps the coupling groove portion 630.

A cross-sectional shape of the coupling groove 610 and the coupling member 650 which are connected with each other may have any one of a circular, a truncated triangular, a T-lettered, a diamond and trapezoidal shapes, but are not limited thereto or thereby.

The auxiliary member 400 may further include a stopper 430 which extends from an end and/or an edge of the side 420. The stopper 430 may, for example, have a bent or curved shape with respect to the side 420. The stopper 430 restricts or effectively prevents movement of the light source unit 500 in a direction away from the inner surface of the auxiliary member 400 (e.g., opposite to a direction in which the coupling member 650 moves into the insertion portion 620), when the auxiliary member 400 and the light source unit 500 are coupled with each other.

As described above, the printed circuit board 510 includes the coupling groove 610, and the auxiliary member includes the coupling member 650, but the invention is not limited thereto. In an alternative exemplary embodiment, the auxiliary member 400 may include the coupling groove 610 and the printed circuit board 510 may include the coupling member 650.

Further, the shape of the coupling unit 600 is not limited to the structure described above, and may have various modified structures. That is, the coupling groove 610 and the coupling member 650 of the printed circuit board 510 and the auxiliary member 400, respectively, are connected to each other without using an additional element such as an adhesive and the like between the printed circuit board 510 and the auxiliary member 400, however, a detailed shape of these features may be variously modified.

A member for radiating heat may be further between the auxiliary member 400 and the light source unit 500. Hereinafter, a first heat radiating member 710 will be described with reference to FIGS. 5 and 6.

Figure 5:
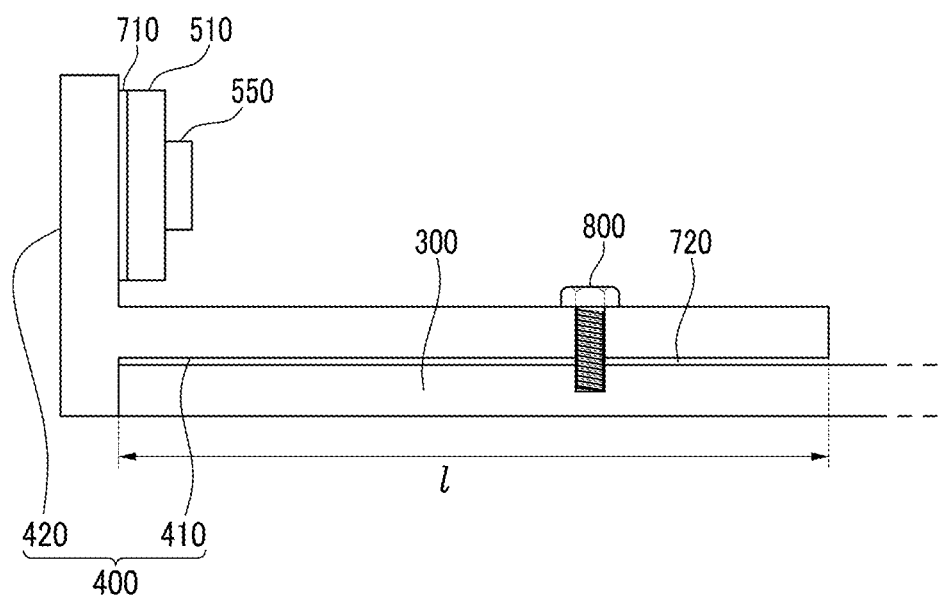
FIG. 5 is a cross-sectional view illustrating an exemplary embodiment of a bottom container member, an auxiliary member and a light source unit in a display device according to the invention.
Figure 6:
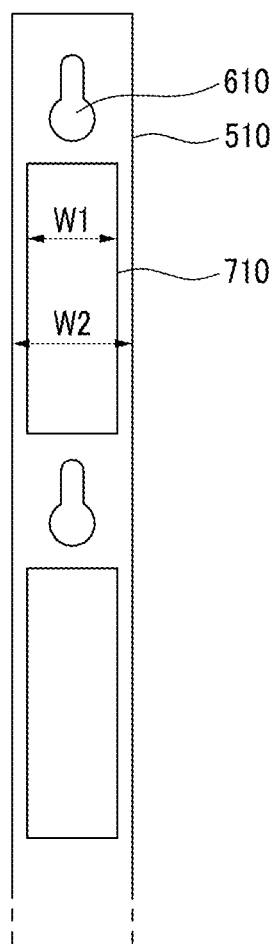
FIG. 6 is a plan view illustrating an exemplary embodiment of a rear side of a light source unit in a display device according to the invention.

FIG. 5 is a cross-sectional view illustrating an exemplary embodiment of a bottom container member, an auxiliary member and a light source unit in a display device according to the invention, and FIG. 6 is a plan view illustrating an exemplary embodiment of a rear side of a light source unit in a display device according to the invention.

The first heat radiating member 710 is between the side 420 of the auxiliary member 400 and the printed circuit board 510 of the light source unit 500.

The first heat radiating member 710 may include a phase change material ("PCM"), but is not limited thereto or thereby. The PCM is a material which accumulates a large amount of heat energy and/or emits the stored heat energy though a phase change process, and accumulates and/or stores heat by using a process in which the material is changed from one state to another state such as from a solid state to a liquid state, from a liquid state to a solid state, from a liquid state to a gas state, from a gas state to a liquid state, and the like. With respect to materials which undergo the phase change process, the phase change is not a chemical reaction such as a chemical coupling or formation but is a change in physical arrangement of molecules.

The phase change materials may be largely classified into an organic material and an inorganic material, such as being classified into four thousand types of phase change materials. However, substantially applicable phase change materials include about two hundred types. Examples of the organic phase change material include materials such as tetradecane, octadecane, and nonadecane as hydrocarbons which include carbon and hydrogen, and examples of the inorganic phase change material includes calcium chloride as a hydrate form in which six water molecules are connected to each other and the like.

Since the auxiliary member 400 and the light source unit 500 are connected to each other by the coupling unit 600, the side 420 of the auxiliary member 400 and the printed circuit board 510 of the light source unit 500 are not close to or in contact with each other and thus a predetermined space may be generated therebetween. In the exemplary embodiment of the display device according to the invention, the first heat radiating member 710 including the phase change material is between the side 420 of the auxiliary member 400 and the rear side of the printed circuit board 510 of the light source unit 500, and thus an air layer generated by the space may be removed.

That is, a contact area between the auxiliary member 400 and the light source unit 500 is increased by the first heat radiating member 710 so that the heat generated from the light source unit 500 is discharged to the auxiliary member 400.

A thickness of the first heat radiating member 710 taken perpendicular to the side 420 of the auxiliary member 400 or the printed circuit board 510 of the light source unit 500 may be about 0.03 mm to about 0.3 mm. When the thickness of the first heat radiating member 710 is less than about 0.03 mm, the air layer between the auxiliary member 400 and the light source unit 500 may not be efficiently removed and thus a heat radiation effect is not sufficiently large to effectively discharge the heat generated from the light source unit. Further, when the thickness of the first heat radiating member 710 is more than about 0.3 mm, a distance between the auxiliary member 400 and the light source unit 500 is undesirably large and thus the heat radiating effect may be reduced.

The first heat radiating member 710 may be coupled such as by adhering to the rear side of the printed circuit board 510 of the light source unit 500. A width W1 of the first heat radiating member 710 may be about 30% to about 100% of a width W2 of the printed circuit board 510. When the width W1 of the first heat radiating member 710 is less than about 30% of the width W2 of the printed circuit board 510, the air layer between the auxiliary member 400 and the light source unit 500 may not be efficiently removed and thus a heat radiation effect is not sufficiently large to effectively discharge the heat generated from the light source unit. Further, when the width W1 of the first heat radiating member 710 is more than about 100% of the width W2 of the printed circuit board 510, a portion of the first heat radiating member 710 which extends beyond the width W2 of the printed circuit board 510 is unnecessary and increases costs.

A length of the first heat radiating member 710 may correspond to a length of the printed circuit board 510. Since the coupling groove 610 is on the rear side of the printed circuit board 510, the first heat radiating member 710 may be at a portion of the rear side which excludes the portion with the coupling groove 610.

Further, as shown in FIG. 6, the first heat radiating member 710 may be between adjacent coupling grooves 610. That is, the length of the first heat radiating member 710 may be less than a distance between the adjacent coupling grooves 610.

Furthermore, referring again to FIG. 5, a second heat radiating member 720 may be further between the auxiliary member 400 and the bottom container member 300. The second heat radiating member 720 may be between a rear side of the bottom 410 of the auxiliary member 400 and a top side of the bottom container member 300. The second heat radiating member 720 may include a phase change material, but is not limited thereto or thereby.

The auxiliary member 400 may be fastened to the bottom container member 300 by a fastening member 800. The fastening member 800 may be a screw and the like, but is not limited thereto or thereby.

The invention is not limited to the display device according to the exemplary embodiment of the invention and may be variously modified.

Figure 7:
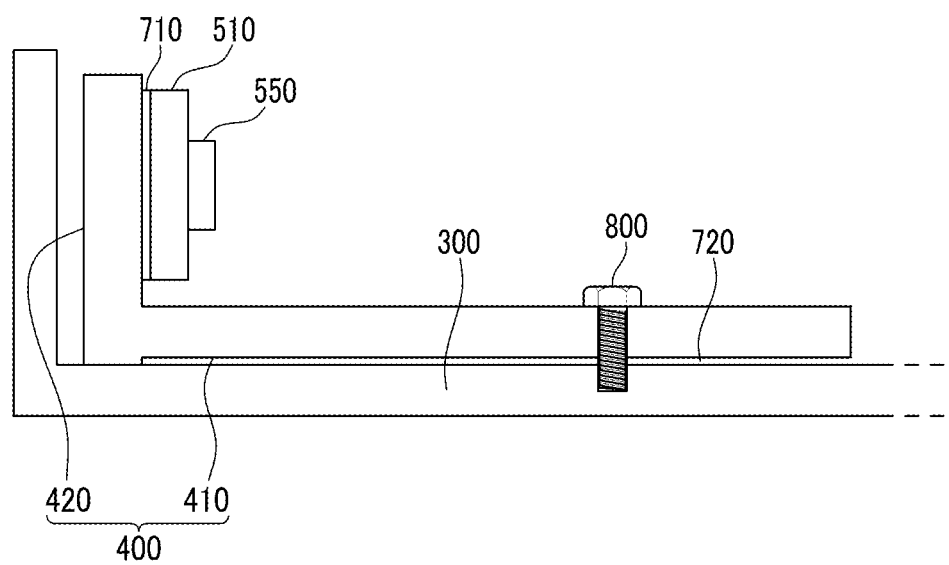
FIG. 7 to FIG. 9 are cross-sectional views illustrating other embodiments of a bottom container member, an auxiliary member and a light source unit in a display device according to the invention.

For example, as illustrated in FIG. 7, the bottom container member 300 may cover a lower side and a side of the auxiliary member 400. That is, a part of the auxiliary member 400 is not exposed outside the bottom container member 300, and the entire auxiliary member 400 may be seated in the bottom container member 300.

Figure 8:
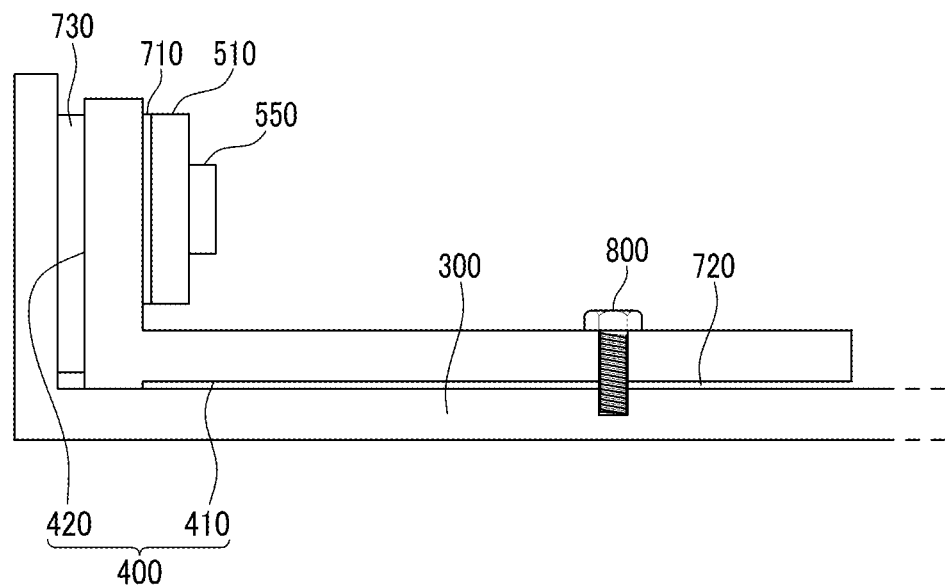

Further, as illustrated in FIG. 8, in the structure in which the bottom container member 300 covers the side of the auxiliary member 400, a third heat dissipating member 730 may be formed between a side of the bottom container member 300 and a side of the auxiliary member 400. The third heat dissipating member 730 may be made of substantially the same shape and material as the second heat dissipating member 720. Further, when the third heat dissipating member 730 is formed, the second heat dissipating member 720 may be omitted.

Figure 9:
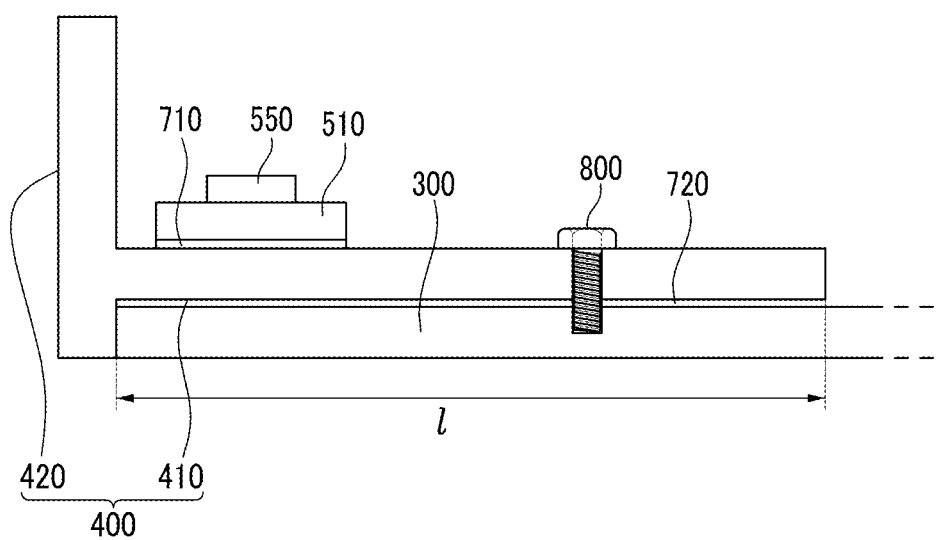

Further, as illustrated in FIG. 9, the printed circuit board 510 is not formed at the side of the auxiliary member 400, but may be formed at a bottom thereof. In this case, the first heat dissipating member 710 may be formed between the bottom of the printed circuit board 510 and the bottom of the auxiliary member 400. Further, the light emitting member 550 is formed at a top side of the printed circuit board 510, and light is emitted from the side of the light emitting member 550. For example, in the case of the light emitting member 550 illustrated in FIG. 9, the light is emitted from the right side.

Hereinafter, a temperature change of each element within the display device depending on a material of the bottom container member 300 in a display device according to the invention will be described below.

Figure 10:
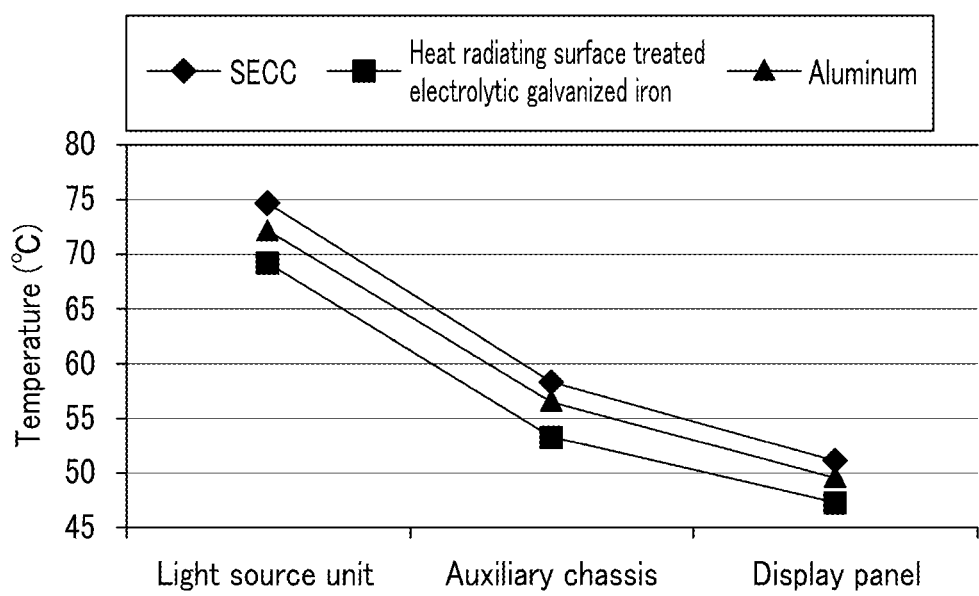
FIG. 10 is a graph illustrating an exemplary embodiment of temperature changes in degrees Celsius (° C.) of a light source unit, an auxiliary member and a display panel with respect to a material of a bottom container member in a display device according to the invention.

FIG. 10 is a graph illustrating an exemplary embodiment of temperature changes in Celsius (° C.) of a light source unit, an auxiliary member and a display panel with respect to a material of a bottom container member in a display device according to the invention.

Where the bottom container member 300 includes electrolytic galvanized iron of which the surface is treated with the heat radiating paint, temperatures of the light source unit 500, the auxiliary member 400 and the display panel 100 are relatively lower as compared with the bottom container member which includes SECC and aluminum.

That is, since the bottom container member 300 includes electrolytic galvanized iron of which the surface is treated with the heat radiating paint, heat emitted from the light source unit 500 is efficiently discharged outside of the bottom container member 300 and/or the display device.

Next, in an exemplary embodiment of a display device according to the invention, a temperature change of each element within the display device depending on usage of the first and second heat radiating members 710 and 720, and cost and weight, and temperature changes depending on a length of the auxiliary member 400 will be described.

Figure 11:
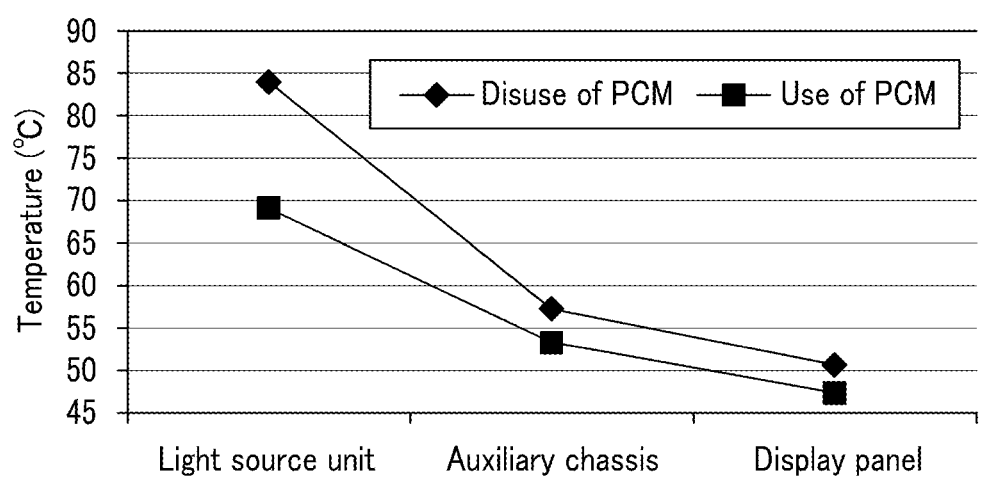
FIG. 11 is a graph illustrating an exemplary embodiment of temperature changes in ° C. of a light source unit, an auxiliary member and a display panel with respect to a phase change material in a display device according to the invention.
Figure 12:
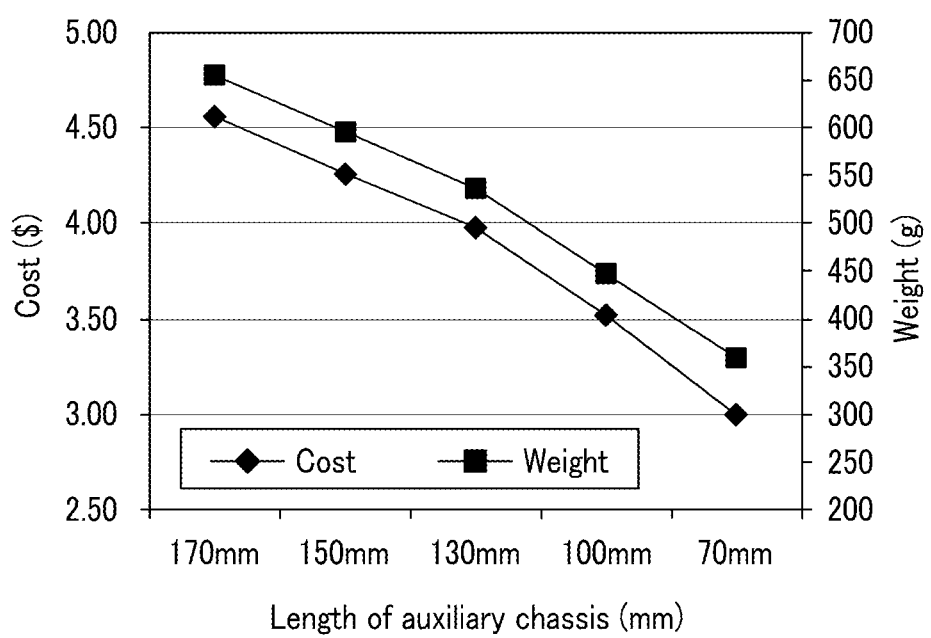
FIG. 12 is a graph illustrating a cost in dollars ($) and a weight in grams (g) with respect to a length in millimeters (mm) of an auxiliary member in a display device according to the invention.
Figure 13:
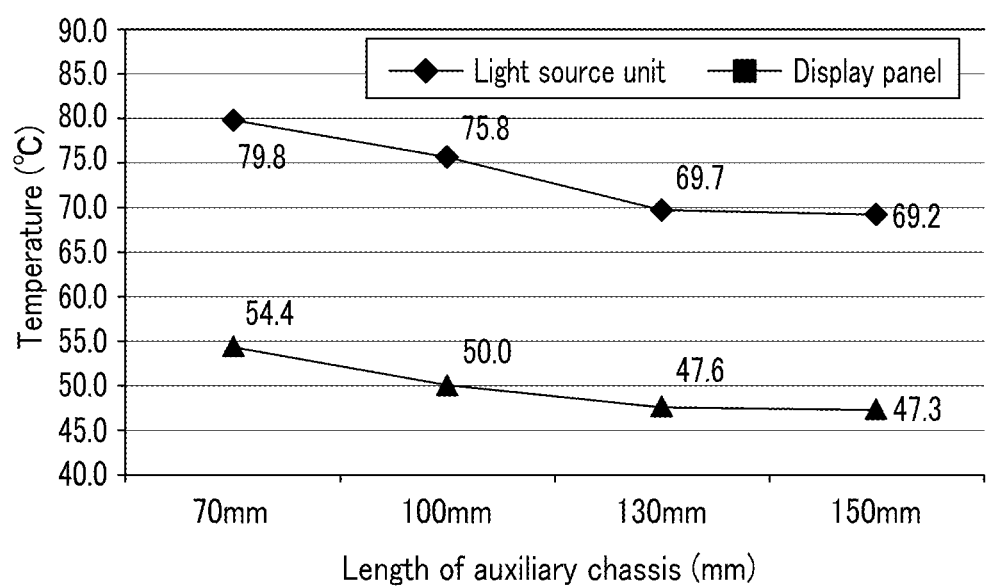
FIG. 13 is a graph illustrating an exemplary embodiment of temperature changes in ° C. of a light source unit and a display panel with respect to a length in mm of an auxiliary member in a display device according to the invention.

FIG. 11 is a graph illustrating an exemplary embodiment of temperature changes in ° C. of a light source unit, an auxiliary member and a display panel depending on a usage of a phase change material in a display device according to the invention, FIG. 12 is a graph illustrating a cost in dollars ($) and a weight in grams (g) depending on a length of an auxiliary member in a display device according to the invention, and FIG. 13 is a graph illustrating temperature changes in ° C. of a light source unit and a display panel depending on a length in mm of an auxiliary member in a display device according to the invention.

As shown in FIG. 11, where the first and second heat radiating members 710 and 720 include phase change materials, temperatures of the light source unit 500, the auxiliary member 400 and the display panel 100 are relatively lower as compared with the first and second heat radiating members 710 and 720 which do not include the phase change materials. Particularly, an effect of the temperature decrease is most significant in the light source unit 500.

That is, since the first heat radiating member 710 is between the auxiliary member 400 and the light source unit 500, and the second heat radiating member 720 is between the auxiliary member 400 and the bottom container member 300, the heat emitted from the light source unit 500 may be efficiently discharged outside of the display device.

As shown in FIG. 12, as the length (reference numeral 'l' of FIG. 5) of the auxiliary member 400 becomes smaller, since the cost of a raw material is reduced, the cost of the display device is reduced. Further, as the length of the auxiliary member 400 becomes smaller, the weight thereof is reduced.

Accordingly, as the length of the auxiliary member 400 becomes smaller, the cost of the display device may be reduced and transport and/or movement of the display device may be easier owing to the lighter weight.

As shown in FIG. 13, as the length (reference numeral 'l' of FIG. 5) of the auxiliary member 400 becomes larger, temperatures of the light source unit 500 and the display panel 100 are decreased. Since the auxiliary member 400 is coupled with the light source unit 500 to discharge the heat emitted from the light source unit 500 to outside the auxiliary member 400 and/or the display device, as the length of the auxiliary member 400 becomes larger, a heat radiating effect may be increased.

When a larger length of the auxiliary member 400 is advantageous to the heat radiating effect, but the larger length is disadvantageous to the cost and the ability to move the display device. Further, a smaller length of the auxiliary member 400 is advantageous to the cost and the ability to move the display device, but the smaller length is disadvantageous to the heat radiating effect. Accordingly, the length of the auxiliary member 400 may be determined by finding a compromise therebetween.

Referring to FIG. 13, when the length of the auxiliary member 400 is increased from about 70 mm to about 100 mm, the effect of the temperature decrease is large, but when the length of the auxiliary member 400 is increased from about 130 mm to about 150 mm, the effect of the temperature decrease is relatively small.

Accordingly, in one exemplary embodiment, the length of the auxiliary member 400 may be about 100 mm to about 150 mm, but is not limited thereto or thereby.

The display panel 100 may have a substantially rectangular shape and include two short sides and two long sides. The length limit of the auxiliary member 400 is a value which is measured based on the light source unit 500 disposed to correspond to one short side of the display panel 100. That is, in the structure where the light source unit 500 is disposed only on one short side of the display panel 100, the length limit is a numerical range capable of maximizing the heat radiating efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
 a display panel;
 a bottom container member which receives the display panel;
 an auxiliary member coupled with the bottom container member, and comprising a bottom, and a side extending from a first edge of the bottom;
 a light source unit coupled with the side of the auxiliary member;
 a first heat radiating member between the side of the auxiliary member and the light source unit, and comprising a first phase change material; and
 a coupling unit which is on the light source unit and on the side of the auxiliary member, and couples the light source unit with the side of the auxiliary member,
 wherein the first heat radiating member between the light source unit and the side of the auxiliary member and comprising the first phase change material, is disposed at a portion of the light source unit which excludes the coupling unit.

2. The display device of claim 1, wherein:
 the bottom container member comprises electrolytic galvanized iron.

3. The display device of claim 2, wherein:
 the light source unit comprises a printed circuit board, and a rear side of the printed circuit board is coupled with the side of the auxiliary member.

4. The display device of claim 3, wherein
 the coupling unit comprises:
  a coupling member on the side of the auxiliary member, and
  a coupling groove defined on the rear side of the printed circuit board and into which the coupling member is inserted.

5. The display device of claim 4, further comprising:
 a second heat radiating member between the auxiliary member and the bottom container member,
 wherein the second heat radiating member comprises a second phase change material.

6. The display device of claim 5, further comprising:
 a fastening member which fastens the auxiliary member to the bottom container member,
 wherein the fastening member comprises a screw.

7. The display device of claim 4, wherein the light source unit further comprises a light emitting member on a front side of the printed circuit board opposite to the rear side.

8. The display device of claim 7, wherein:
the electrolytic galvanized iron comprises a heat radiating paint-treated surface.

9. The display device of claim 8, wherein:
the heat radiating paint comprises a material comprising a carbon nanotube.

10. The display device of claim 4, wherein:
a length from the first edge of the bottom of the auxiliary member to an opposing second edge is about 100 millimeters to about 130 millimeters.

11. The display device of claim 4, wherein:
a thickness of the first heat radiating member is about 0.03 millimeter to about 0.3 millimeter.

12. The display device of claim 11, wherein:
a width of the first heat radiating member is about 30% to about 100% a width of the printed circuit board.

13. The display device of claim 12, wherein:
the coupling unit further comprises a plurality of coupling grooves, and
the first heat radiating member is between adjacent coupling grooves.

14. The display device of claim 4, wherein:
the coupling member comprises:
  a protrusion protruding from the side of the auxiliary member; and
  a coupling protrusion at a distal end of the protrusion.

15. The display device of claim 14, wherein:
the coupling groove comprises:
  an inserting portion into which the coupling protrusion of the coupling member is inserted; and
  a coupling groove portion which is continuous with and extends from the inserting portion, and to which the protrusion of the coupling member is hooked.

16. The display device of claim 15, wherein:
a cross section of the coupling member and the coupling groove is a circular, truncated triangular, T-lettered, diamond or trapezoidal shape.

17. The display device of claim 16, wherein:
the auxiliary member further comprises:
a stopper extending from an edge of the side.

18. A display device, comprising:
a display panel;
a bottom container member which receives the display panel;
an auxiliary member coupled with the bottom container member, and comprising a bottom, and a side extending from an edge of the bottom;
a light source unit coupled with the side of the auxiliary member; and
a heat radiating member between the auxiliary member and the bottom container member, and comprising a phase change material,
wherein a length from a first edge of the bottom of the auxiliary member to an opposing second edge is about 100 millimeters to about 130 millimeters.

19. The display device of claim 18, wherein:
the bottom container member comprises electrolytic galvanized iron.

20. The display device of claim 19, wherein:
the light source unit comprises a printed circuit board, and a rear side of the printed circuit board is coupled with the auxiliary member,
further comprising a coupling unit which couples the printed circuit board with the side of the auxiliary member, and comprises:
  a coupling member on the side of the auxiliary member, and
  a coupling groove on the rear side of the printed circuit board and into which the coupling member is inserted.

21. The display device of claim 20, wherein:
the electrolytic galvanized iron comprises a heat radiating paint-treated surface.

* * * * *